(12) United States Patent
Kona et al.

(10) Patent No.: US 8,688,947 B1
(45) Date of Patent: Apr. 1, 2014

(54) ALIGNED DATA ACCESS

(75) Inventors: Anitha Kona, Austin, TX (US); Moinul H. Khan, Austin, TX (US); Bradley C. Aldrich, Austin, TX (US)

(73) Assignee: Marvell International Ltd., Hamilton (BM)

( * ) Notice: Subject to any disclaimer, the term of this patent is extended or adjusted under 35 U.S.C. 154(b) by 666 days.

(21) Appl. No.: 12/276,084

(22) Filed: Nov. 21, 2008

Related U.S. Application Data (60) Provisional application No. 60/989,673, filed on Nov. 21, 2007.

(51) Int. Cl.
*G06F 12/10* (2006.01)

(52) U.S. Cl.
USPC ......................................................... 711/201

(58) Field of Classification Search
USPC ......................................................... 711/201
See application file for complete search history.

(56) References Cited

U.S. PATENT DOCUMENTS

| | | | |
|---|---|---|---|
| 5,701,517 A | 12/1997 | Carpenter | |
| 6,000,006 A | 12/1999 | Bruce et al. | |
| 6,539,467 B1 * | 3/2003 | Anderson et al. | 711/219 |
| 6,567,304 B1 | 5/2003 | Kleveland | |
| 6,615,324 B1 | 9/2003 | Fernald | |
| 6,717,847 B2 | 4/2004 | Chen | |
| 6,735,773 B1 * | 5/2004 | Trinh et al. | 719/328 |
| 6,876,702 B1 | 4/2005 | Hui et al. | |
| 7,038,950 B1 | 5/2006 | Hamilton et al. | |
| 7,076,631 B2 | 7/2006 | Herron | |
| 7,284,106 B1 | 10/2007 | Fernald | |
| 7,356,676 B2 * | 4/2008 | Paver et al. | 712/300 |
| 7,499,343 B2 * | 3/2009 | Kang | 365/189.05 |
| 7,613,871 B2 | 11/2009 | Tanaka et al. | |
| 7,649,539 B2 | 1/2010 | Evans et al. | |
| 7,734,874 B2 | 6/2010 | Zhang et al. | |
| 7,822,955 B2 * | 10/2010 | Flynn et al. | 712/300 |
| 7,945,825 B2 | 5/2011 | Cohen et al. | |
| 8,127,104 B1 | 2/2012 | Shen | |
| 8,131,915 B1 | 3/2012 | Yang | |
| 8,423,710 B1 | 4/2013 | Gole | |
| 8,533,386 B1 | 9/2013 | Yang | |
| 2002/0116584 A1 | 8/2002 | Wilkerson | |
| 2004/0027901 A1 | 2/2004 | Shiga et al. | |
| 2004/0098556 A1 | 5/2004 | Buxton et al. | |
| 2004/0199734 A1 | 10/2004 | Rajamani et al. | |
| 2006/0010304 A1 * | 1/2006 | Homewood et al. | 711/201 |
| 2006/0288153 A1 | 12/2006 | Tanaka et al. | |
| 2006/0288188 A1 | 12/2006 | Ma et al. | |
| 2007/0176939 A1 | 8/2007 | Sadowski | |

(Continued)

OTHER PUBLICATIONS

Coprocessor, Wikipedia Article, Nov. 2006, http://en.wikipedia.org/w/index.php?oldid=539672685.*

(Continued)

*Primary Examiner* — Alford W. Kindred
*Assistant Examiner* — Ramon A Mercado (57) ABSTRACT

In one or more embodiments, an apparatus comprises an alignment module implemented in hardware to identify requested data that is not aligned on a natural alignment boundary of a memory and load at least two sets of neighboring data such that each said set includes at least a portion of the requested data. The alignment module is further configured to extract the requested data from the at least two sets of neighboring data and output the extracted data to a processor.

19 Claims, 9 Drawing Sheets

(56) References Cited

U.S. PATENT DOCUMENTS

| | | |
|---|---|---|
| 2007/0229503 A1 | 10/2007 | Witzel et al. |
| 2007/0271609 A1 | 11/2007 | Chen et al. |
| 2007/0283086 A1 | 12/2007 | Bates |
| 2008/0126728 A1 | 5/2008 | Fernald |
| 2008/0147978 A1 | 6/2008 | Pesavento et al. |
| 2008/0195801 A1 | 8/2008 | Cheon et al. |
| 2008/0270679 A1 | 10/2008 | Joo |
| 2008/0294951 A1 | 11/2008 | Ahmad et al. |
| 2009/0067511 A1 | 3/2009 | Wei et al. |
| 2009/0113166 A1 | 4/2009 | Houston et al. |
| 2009/0122610 A1 | 5/2009 | Danon et al. |
| 2009/0132770 A1 | 5/2009 | Lin |
| 2009/0150599 A1 | 6/2009 | Bennett |
| 2009/0154000 A1 | 6/2009 | Kojima |
| 2009/0228739 A1 | 9/2009 | Cohen et al. |

OTHER PUBLICATIONS

"Non-Final Office Action", U.S. Appl. No. 12/180,238, (Apr. 12, 2011), 7 pages.

"Non-Final Office Action", U.S. Appl. No. 12/332,870, (Apr. 25, 2011), 15 pages.

"Non-Final Office Action", U.S. Appl. No. 12/396,250, (Jun. 23, 2011), 6 pages.

"U.S. Appl. No. 12/726,310", filed Mar. 17, 2010, 36 pages.

"U.S. Appl. No. 12/862,600", filed Aug. 24, 2010, 36 pages.

"Non-Final Office Action", U.S. Appl. No. 13/406,756, Nov. 5, 2012, 4 pages.

"Notice of Allowance", U.S. Appl. No. 12/726,310, Dec. 18, 2012, 6 pages.

"Non-Final Office Action", U.S. Appl. No. 12/726,310, Aug. 1, 2012, 11 pages.

"Final Office Action", U.S. Appl. No. 12/332,870, (Oct. 12, 2011), 17 pages.

"Notice of Allowance", U.S. Appl. No. 12/180,238, (Oct. 25, 2011), 6 pages.

"Notice of Allowance", U.S. Appl. No. 12/396,250, (Nov. 16, 2011), 4 pages.

"Non-Final Office Action", U.S. Appl. No. 12/332,870, May 8, 2013, 19 pages.

"Notice of Allowance", U.S. Appl. No. 13/406,756, May 8, 2013, 7 pages.

"Restriction Requirement", U.S. Appl. No. 12/862,600, May 24, 2013, 7 pages.

"Final Office Action", U.S. Appl. No. 12/332,870, Sep. 10, 2013, 20 pages.

"Network Attached Storage (NAS) Advantages", Retrieved from: <http://www.html.co.uk/86/network-attached-storage-nas-advantages.html> on Oct. 7, 2013, Aug. 22, 2008, 4 pages.

"Non-Final Office Action", U.S. Appl. No. 13/860,394, Oct. 2, 2013, 13 pages.

"Non-Final Office Action", U.S. Appl. No. 12/862,600, Oct. 16, 2013, 8 pages.

* cited by examiner

ALIGNED DATA ACCESS

RELATED APPLICATION

This application claims priority under 35 U.S.C. §119(e) to U.S. Provisional Application Ser. No. 60/989,673, filed on Nov. 21, 2007, the entire disclosure of which is hereby incorporated by reference.

BACKGROUND

Some traditional processors are configured such that memory access addresses are to be aligned on a natural alignment boundary. These boundaries define "words" stored in the memory which may be used to improve efficiency in handling data by the processors. However, in some instances data may be requested that it is not aligned on the natural alignment boundaries in the memory. For instance, data may be stored in memory such that it spans multiple words, e.g., a most significant bit and a least significant bit of the data are stored using different words in the memory.

Traditional techniques to align data access, however, were inefficient and consumed valuable resources, e.g., processor and/or software resources. Therefore, traditional processors that are optimized to process data aligned on natural alignment boundaries (e.g., for words) may suffer a significant performance penalty when unaligned data is requested.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, an apparatus comprises an alignment module that is external to a processor and that is configured to identify requested data that is not aligned on a natural alignment boundary of the memory and load at least two sets of neighboring data such that each said set includes at least a portion of the requested data. The alignment module is further configured to extract the requested data from the at least two sets of neighboring data and output the extracted data to the processor.

In one or more embodiments, an apparatus comprises an alignment module to align data that is not aligned on a natural alignment boundary in memory by extracting the data from at least two sets of neighboring data in the memory. Each of the sets of the neighboring data includes at least a portion of the data. The alignment module is further configured to determine an offset based on the data, wherein the offset is used to extract the data from the at least two said sets and employ the offset to align at least one subsequent read of data from the memory.

In one or more embodiments, a method comprises identifying requested data that is not aligned on a natural alignment boundary of a memory and loading at least two sets of neighboring data such that each said set includes at least a portion of the requested data. The method also comprises extracting the requested data from the at least two sets of neighboring data and outputting the extracted data to a processor.

In one or more embodiments, a method comprises aligning data that is not aligned on a natural alignment boundary in memory by extracting the data from at least two sets of neighboring data in the memory such that each of the sets of the neighboring data includes at least a portion of the data. The method also comprises determining an offset used to extract the data from the at least two said sets and employing the offset to align at least one subsequent read of data from the memory.

BRIEF DESCRIPTION OF THE DRAWINGS

The detailed description is described with reference to the accompanying figures. In the figures, the left-most digit(s) of a reference number identifies the figure in which the reference number first appears. The use of the similar reference numbers in different instances in the description and the figures may indicate similar or identical items.

DETAILED DESCRIPTION

Overview

Processors may be configured to support techniques in which an entire "word" is accessed from memory at a time. For example, a processor may obtain data included in a single word from memory in a single read operation when the data is aligned on a natural alignment boundary. However, in some instances data that is requested by the processor is not contained in a single word. For instance, the most significant bit and a least significant bit of the data may be stored using different words in the memory and therefore do not coincide with a natural alignment boundary. Consequently, efficiencies that may be gained through use of words by the processor and/or memory to read, write and process data may be diminished or even lost.

Techniques are described to align data access. In one or more embodiments, an alignment module is implemented "outside" of a processor in hardware such that resources of the processor are not used to align data that is unaligned in memory. For example, the alignment module may be configured as hardware that is communicatively coupled to the processor and is responsible for aligning data requested by the processor that is not aligned.

In at least one implementation, the processor and/or software executed on the processor are not aware as to whether the data was or was not aligned. Therefore, in this implementation the processor and/or software executed on the processor may be made and operate with increased efficiency. For example, the processor may process data that was obtained from memory even when the data did not coincide with a natural alignment boundary without having to use valuable processing resources of the processor (e.g., software executed on the processor and/or specially configured hardware of the processor itself) to align the data. Rather, the alignment module in this example is responsible for aligning the unaligned data. Further discussion of aligning unaligned data may be found in relation to FIGS. 1-5.

In at least one implementation, the alignment module employs techniques to determine an offset used to extract requested data from two or more neighboring sets (e.g., words) of data in memory. For example, at least a portion of the requested data may be included in each of the neighboring sets of data. However, the requested data may be offset in one or more of the sets of data. When one or more subsequent reads of data are regular (e.g., the "reads" are for successive data stored in the memory), the offset used to extract the requested data may be employed to align data that is a subject of the subsequent reads. For example, the offset itself may be used to calculate an offset used for a subsequent read, may be "reused" without further calculation, and so on. Further discussion of offsets may be found in relation to FIGS. 4-5.

In the discussion that follows, example operating environments are described that may incorporate the aligned data access techniques. Example procedures are also described that may be employed in the example operating environments, as well as other environments. Thus, in instances in the discussion of the example procedures reference will be made to the example environments by way of example. Therefore, implementation of the example procedures is not limited to the example environments.

Operating Environment

Figure 1:
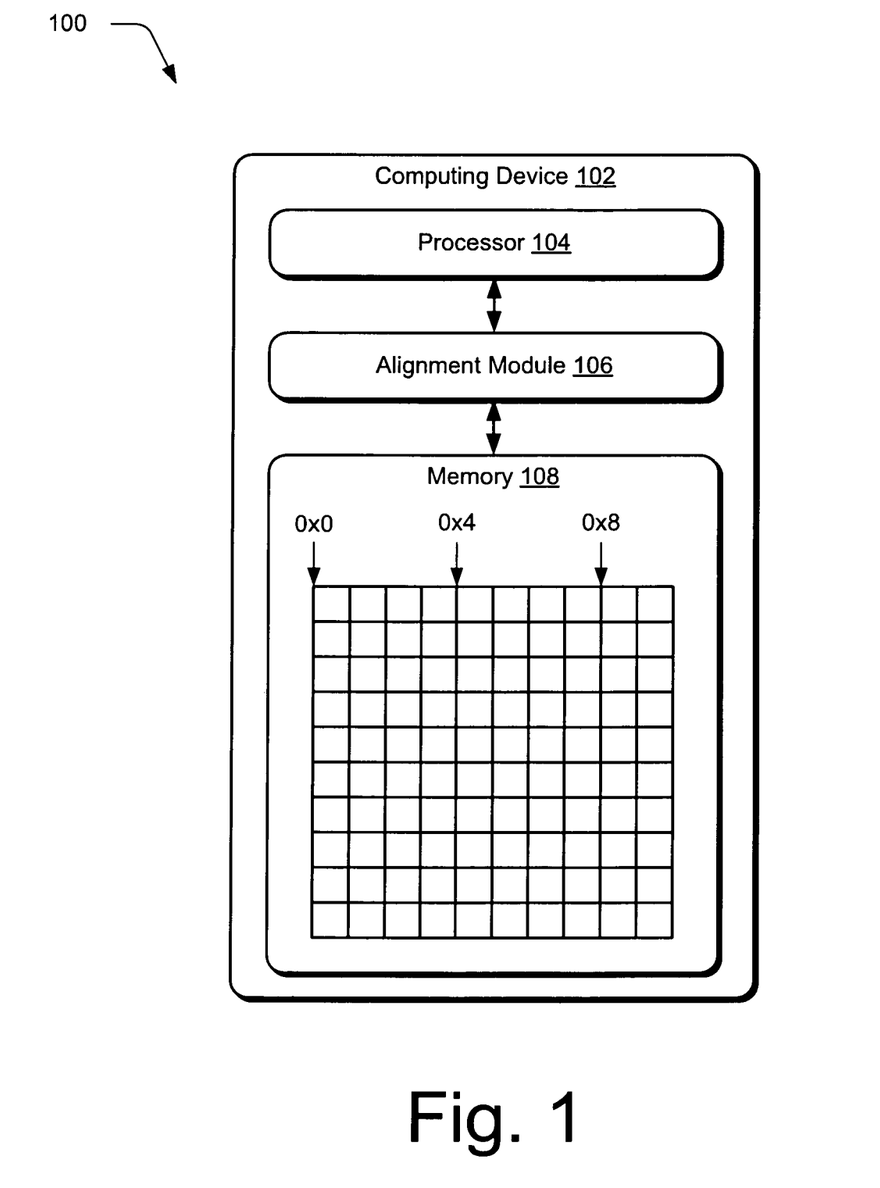
FIG. 1 is an illustration of an example operating environment that is configured to employ aligned data access techniques.

FIG. 1 illustrates an environment 100 in accordance with one or more embodiments. The environment includes a computing device 102 that may be configured in a variety of ways, examples of which may be found in relation to FIGS. 6-13. The computing device 102 in the illustrated instance includes a processor 104, an alignment module 106 and a memory 108.

The processor 104 is not limited by the materials from which it is formed or the processing mechanisms employed therein. For example, processor 104 may be comprised of semiconductor(s) and/or transistors (e.g., electronic integrated circuits (ICs)). In such a context, processor-executable instructions may be electronically-executable instructions. Alternatively, processor mechanisms may include, but are not limited to, quantum computing, optical computing, mechanical computing (e.g., using nanotechnology), and so forth.

Additionally, although a single memory 108 is shown, a variety of types and combinations of memory may be employed, such as random access memory (RAM), hard disk memory, removable medium memory, and other types of computer-readable media. Thus, each of the devices of FIG. 1 may be representative of one or more devices, e.g., the processor 104 may be representative of a plurality of processors that are executed in parallel, memory 108 may be representative of volatile (e.g., tightly-coupled random access memory) and/or nonvolatile memory, and so on.

The processor 104 may be configured to accept memory access addresses that are aligned on natural alignment boundaries. For instance, the memory 108 is illustrated as including a plurality of natural alignment boundaries positioned at four byte intervals, examples of which are illustrated as "0x0", "0x4" and "0x8". Each of the natural alignment boundaries may be used to define a word in memory that may be read from and/or written to in a single operation. For example, data included in the word in the memory 108 defined between natural alignment boundary "0x0" and "0x4" may be read from the memory 108 in a single atomic operation.

However, in some instances a request may be received for data that is not aligned on one of the natural alignment boundaries. For example, multimedia data is typically sub-word long, e.g., 8 bit, 16 bit, and so on. To perform a motion search, for instance, a source block (e.g., 4×4, 8×8) is compared with reference blocks in different positions. This comparison may be done for a variety of different blocks occupying a variety of different locations in the memory 108. For example, the reference blocks may be as close as a single byte and therefore one or both of the reference blocks may not be aligned on a natural alignment boundary of the memory 108.

The alignment module 106 is representative of functionality to align data obtained from the memory 108 that is not positioned on a natural alignment boundary of the memory 108. For example, the alignment module 106 may receive a request for data that is not aligned on a natural alignment boundary, e.g., at the four byte interval in this example. Accordingly, the alignment module 106 may load two or more sets (e.g., words) of neighboring data in which each set includes at least a portion of requested data. The alignment module 106 may then provide the requested data to the processor 104 for processing.

Thus, in this example the resources of the processor 104 are not utilized to perform the alignment. In an embodiment, the processor 104 may not even be aware that the requested data was not aligned on a natural alignment boundary. Accordingly, the processor 104 and software executed by the processor 104 may be configured and written, respectively, without addressing whether data to be read from the memory 108 is or is not "aligned", e.g., on a natural alignment boundary, thereby simplifying the configuration and/or writing of the processor 104 and software, respectively. Aligned data access techniques may be employed on a wide variety of data by a wide variety of devices, an example of which may be found in relation to the following figure.

Figure 2:
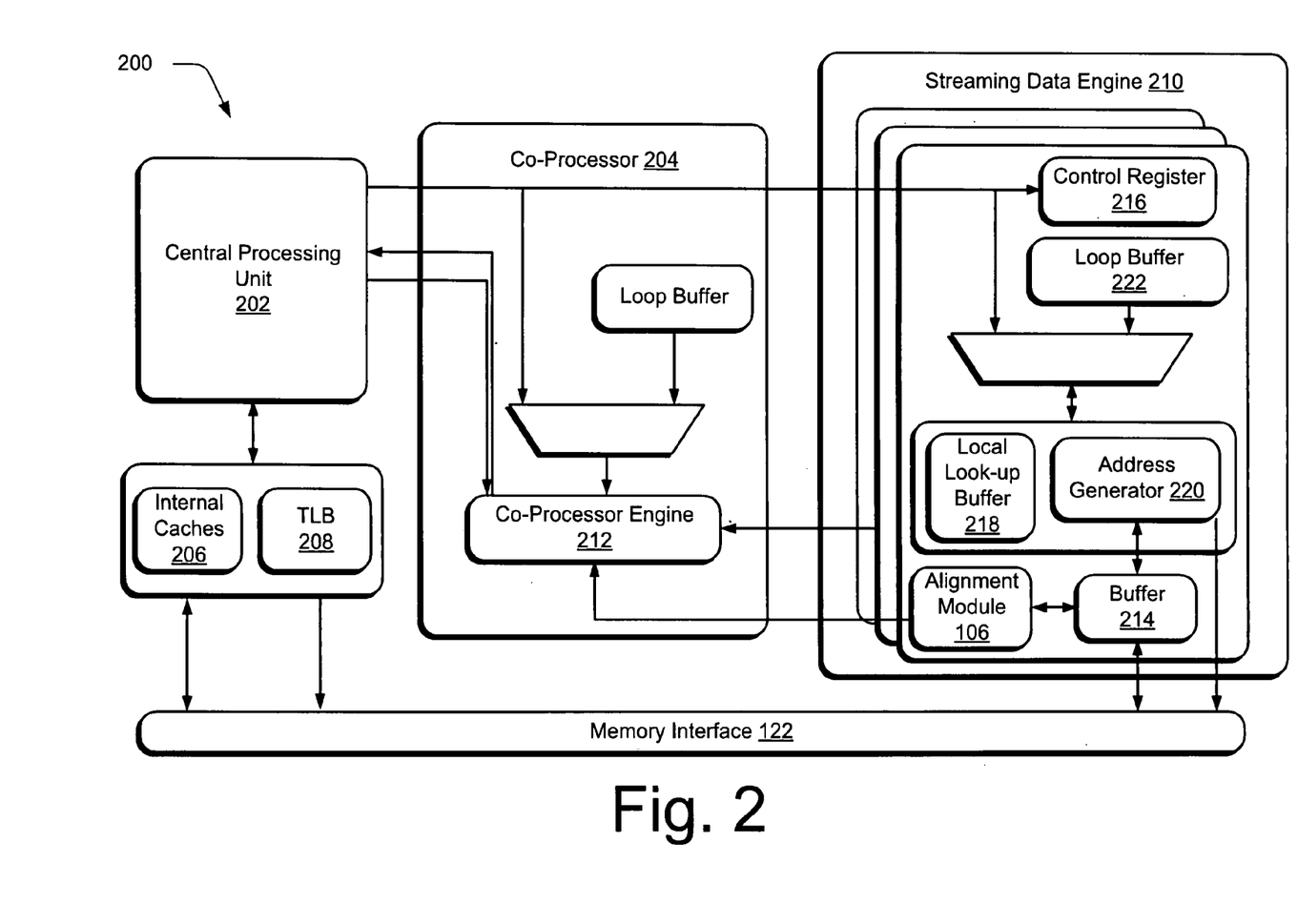
FIG. 2 is an illustration of a system in an example implementation in which an alignment module of FIG. 1 is illustrated as being implemented within a wireless multimedia extensions (MMX) configuration.

FIG. 2 illustrates a system 200 in accordance with one or more embodiments in which the alignment module 106 of FIG. 1 is illustrated as being implemented within a wireless multimedia extensions (MMX) configuration. In one or more embodiments, system 200 includes a processor such as (CPU) 202 and one or more co-processors 204, which may or may not correspond to the processor 104 of FIG. 1. The CPU 202 and the one or more co-processors 204 are illustrated as operating in conformance with a wireless MMX configuration. The CPU 202 may be an advanced RISC processor (ARM), e.g., an advanced reduced instruction set code machine.

The CPU 202 can include one or more internal caches 206 which are associated with the CPU 202. The CPU 202 can include a table lookup buffer (TLB) 208 that maintains commonly used data for the CPU 202.

The system 200 includes, in this example, a streaming data engine 210 that is communicatively coupled to the co-processor 204. If the co-processor 204 is not included, the streaming data engine 210 can be communicatively coupled to CPU 202 directly. The streaming data engine 210 may be implemented as hardware, firmware, software, programmable logic and combinations thereof.

While the system 200 can include multiple streaming data engines, an individual streaming data engine may be assigned to a communication channel. For instance, two streaming data engines can separately flow multimedia data to the co-processor 204, while one streaming data engine communicates data to be stored in memory, e.g., the memory 108 of FIG. 1. Memory may include, but is not limed to, random access memory (RAM), external memory, double data rate random access memory (DDR) memory, and so on.

In described examples, the streaming data engine 210 includes a buffer 214, e.g., a first in/first out (FIFO) buffer. A FIFO buffer communicates data which was received first before communicating subsequently received data. In this way, the multimedia data can flow or stream through the buffer 214 to or from the co-processor 204.

When formed as a separate module from a co-processor 204, the streaming data engine 210 can be configured to initially receive a set of parameters from the co-processor 204 in order to establish a communication channel to carry the multimedia data stream. For example, by initially communicating the set of parameters, the co-processor 204 may instruct the streaming data engine 210 how and when to communicate multimedia data. As a result, the streaming data engine 210 may relieve the co-processor 204 from issuing explicit load or store instructions for the multimedia data.

The streaming data engine 210 and or the co-processor 204 may link a local register with a co-processor register as part of initiating a communication channel to carry the stream of multimedia data. From the co-processor's 204 perspective, the multimedia data block may be treated as if the multimedia data is available to a co-processor engine 212 by linking the local register with the co-processor register. By linking the local register to the co-processor register, the multimedia data may be communicated in time for use by the co-processor 204, e.g., to synchronize communication between the buffer 214 and the co-processor engine 212. This technique may be performed even though the co-processor 204 has not issued an explicit instruction to load or store the multimedia data.

The streaming data engine 210 may also include a control register 216 that maintains the set of parameters, or one or a combination of the parameters. Other local registers (e.g., "local" to the streaming data engine 210) may maintain the set of parameters or be used in place of the control register 216. For example, individual parameters or data derived from a parameter may be included in a local lookup buffer 218.

The streaming data engine 210 uses an address generator 220 to generate or calculate an address for the multimedia data block. The address generator 220 can calculate the address from an initial or base address included in the set of parameters. The address generator 220 may calculate sequential addresses for multimedia data because multimedia data may be stored or retrieved sequentially from memory. For example, a second multimedia data block can be given an address which is subsequent to an immediately preceding multimedia data block.

The streaming data engine 210, in embodiments, can include a loop buffer 222 that maintains data related to how many iterations or repetitions the streaming data engine 210 is to perform before terminating. When reading data, one or more parameters can specify how many multimedia data blocks are to be loaded onto the co-processor 204. A parameter may also specify how many times the address generator 220 should generate an address. Thus, the loop buffer 222 may communicate this iteration data to the address generator 220, or the address generator 220 can access the loop buffer 222 for this data.

The loop buffer 222, in one or more embodiments, may contain a code sequence that instructs the address generator 120 how many cycles to execute before terminating. For example, the loop buffer 222 may describe the address generator's 220 addressing mode as a series of sequences which are preformed for the specified number of iterations, e.g., how many times the address generator 220 should repeat address generation. When generating addresses, the address generator 220 can execute from the code included in the loop buffer 222.

The loop buffer 222 can be updated as data blocks are communicated. Upon communicating a first multimedia data block, the address generator 220 may update the number of iterations in the loop buffer 222 and repeat generating an address for a second multimedia data block.

Local register(s) included in the streaming data engine 210 may be used to maintain the address. For example, when reading data, the address generator 220 may generate an address for a multimedia data block streamed into the buffer 214. The address may be maintained in a local register so that the multimedia data within the block can be referenced for communication to/from the co-processor 204. In specific embodiments, a register including the address for a multimedia data block may include one or more individual parameters or descriptors that describe the stream of multimedia data including the multimedia data block. The one or more local registers, in-turn, may maintain one or more suitable structures within the streaming data engine 210. For example, the register may be included in buffer 214 or in the local lookup buffer 218 which is included in the streaming data engine 210.

The streaming data engine 210 is also illustrated as including the alignment module 106 of FIG. 1. When utilized within the system 200 of FIG. 2, the alignment module 106 may provide automatic alignment of data obtained from memory (e.g., memory 108 of FIG. 1) through the memory interface 122. An example is an image frame that starts at an unaligned byte boundary such that each subsequent block is unaligned by a same or deterministic amount. This functionality may be combined with automated data loads and stores provided by the streaming data engine 210 such that the resources of the CPU 202 and co-processor 204 may be further focused on its intended function.

The illustrated system 200 of FIG. 2 may be implemented as a stream control unit to feed a wireless MMX technology. The alignment module 106 is added to align data flowing into registers of the wireless MMX technology. The alignment module 106 has alignment logic per channel in the illustrated system 200 as depicted by the streaming data engine 210. The alignment module 106 may receive command and control information from the address generator 220, further discussion of which may be found in relation to FIG. 3.

When a block of eight byte video data is requested on a natural alignment boundary, for instance, two 8-byte registers are read in and one 8-byte value may be extracted by the alignment module 106. For a majority of algorithms, a subsequent operating data block is adjacent to the previous block by an offset of one to eight bytes. Therefore, the alignment module 106 may use an offset computed for the first operating data block for subsequent operating data blocks, further discussion of which may be found in relation to FIGS. 4 and 5. A stream register file may be configured to address this data accessing scheme. Thus, the alignment module 106 allows a general-purpose processor to work on an unaligned data boundary and makes execution of the processor more efficient. These alignment techniques are also equally applicable to other types of memory, such as caches.

Figure 3:
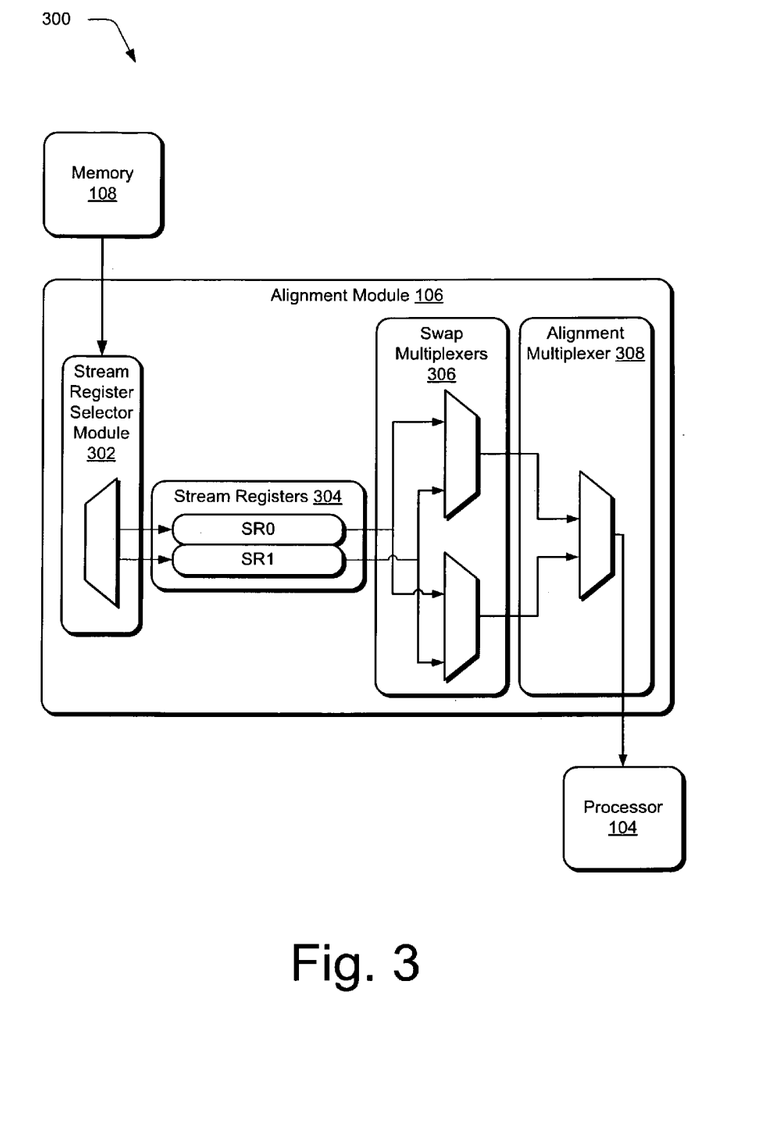
FIG. 3 depicts a system in an example implementation in which the alignment module 106 of FIGS. 1 and 2 is shown in greater detail.

FIG. 3 depicts a system 300 in an example implementation in which an example of the alignment module 106 of FIGS. 1 and 2 is shown in greater detail. The alignment module 106 is illustrated as being communicatively coupled to the memory 108 and the processor 104. Further, the alignment module 106 is illustrated as reading data from the memory 108 and providing the data to the processor 104.

The assignment module 106 includes a stream register selector module 302, a plurality of stream registers 304, swap multiplexers 306, and an alignment multiplexer 308. The stream register selector module 302 is representative of functionality to select a particular stream from which data is to be retrieved from the memory 108. The stream register 304 may then be used to store the data retrieved from the memory 108 by the stream register selector module 302. For example, "SR0" may be used to store a first set of neighboring data and "SR1" may be used to store a second set of neighboring data. Each of these sets of neighboring data includes at least a portion of data that was requested by the processor 104.

Swap multiplexers 306 may be used to swap bits obtained from the neighboring words based on which the stream registers 304 are considered most significant. For example, during alignment between SR0 and SR1, one of them may be considered to be the least significant and the other one the most significant. It can be either way based on the address being accessed, which may be provided to the swap multiplexers 306 by the address generator 220 of FIG. 2. From the address of the data, for instance, the last four bits of the least significant bits may be used to determine which register (e.g., SR0 or SR1 in the illustrated example) should be considered to be the most significant. Which of the stream registers 304 are considered most significant during subsequent reads from memory 108 may then alternate, further discussion of which may be found in relation to FIG. 4.

An output of the swap multiplexers 306 may then be provided to the alignment multiplexer 308 to extract the requested data from the neighboring sets of data. The output of the alignment multiplexer 308 may then be provided to the processor 104. Thus, in this example processor 104 receives aligned data regardless of whether the data was stored in the memory 108 at a natural alignment boundary.

Figure 4:
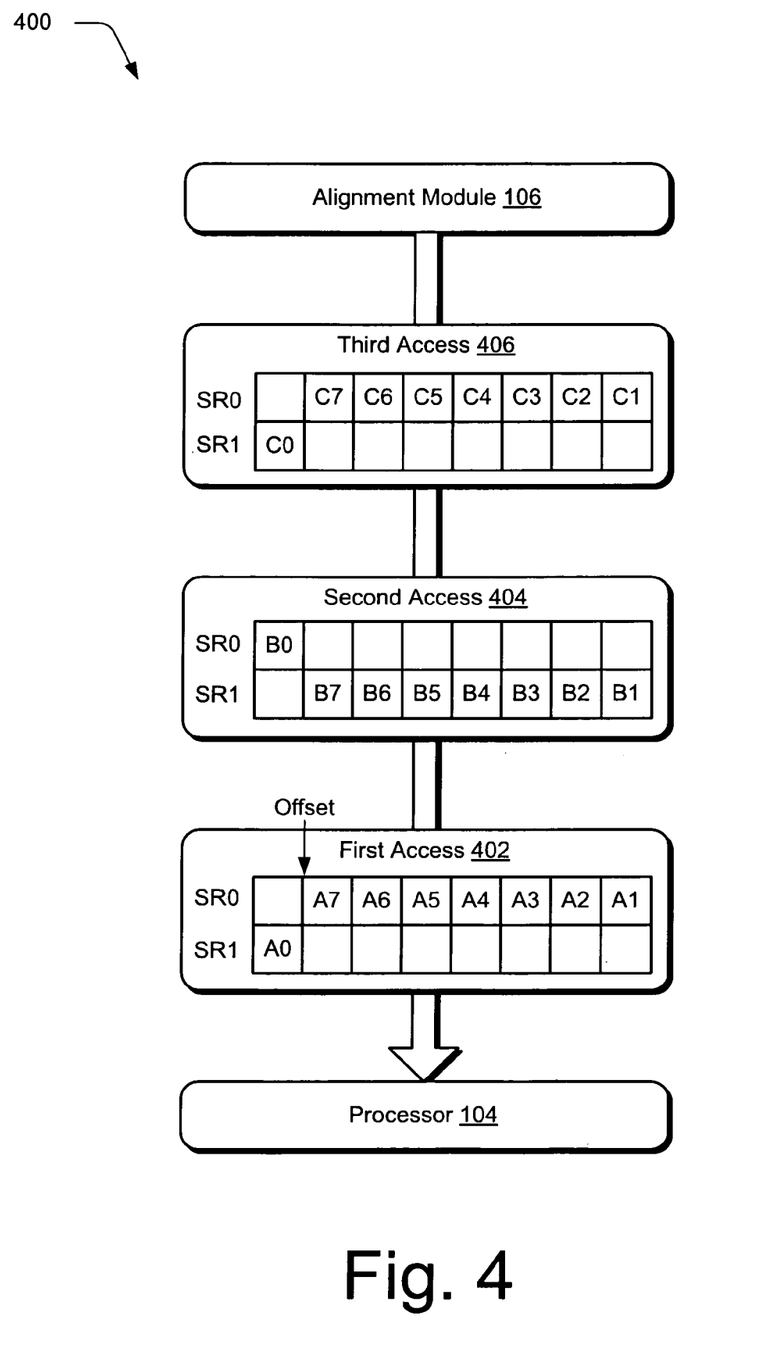
FIG. 4 depicts a system in an example implementation in which the alignment module 106 of FIGS. 1, 2 and 3 is shown as computing an offset for unaligned data to be employed in a subsequent read of data.

FIG. 4 depicts a system 400 in an example implementation in which the processor 104 receives data from the alignment module 106 of FIG. 3. A plurality of sequential reads to the memory 108 of FIG. 3 are illustrated, examples of which are depicted as a first access 402, a second access 404 and a third access 406. Each access is depicted as including as a series of blocks, with data in blocks illustrating from "where" bits which form the data was received with respect to the stream registers 304 of FIG. 3. For example, a first access 402 is depicted as receiving bit "A0" from stream register "SR1" and the rest of the bits from "SR0". Accordingly, an offset may be defined between bits "A0" and "A7" obtained from registers "SR1" and "SR0", respectively.

Additionally, in the illustrated example which of the stream registers are considered the most significant alternates in the subsequent memory accesses. For instance, stream register "SR0" may be considered the most significant for the first access 402 and the third access 406. However, stream register "SR1" may be considered the most significant for the second access 404. A variety of other examples are also contemplated, further discussion of which may be found in relation to the following example procedure.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, e.g., memory 108 of FIG. 1. The features of the alignment techniques described below are platform-independent, meaning that the techniques may be implemented on a variety of commercial computing platforms having a variety of processors.

Example Procedure

Figure 5:
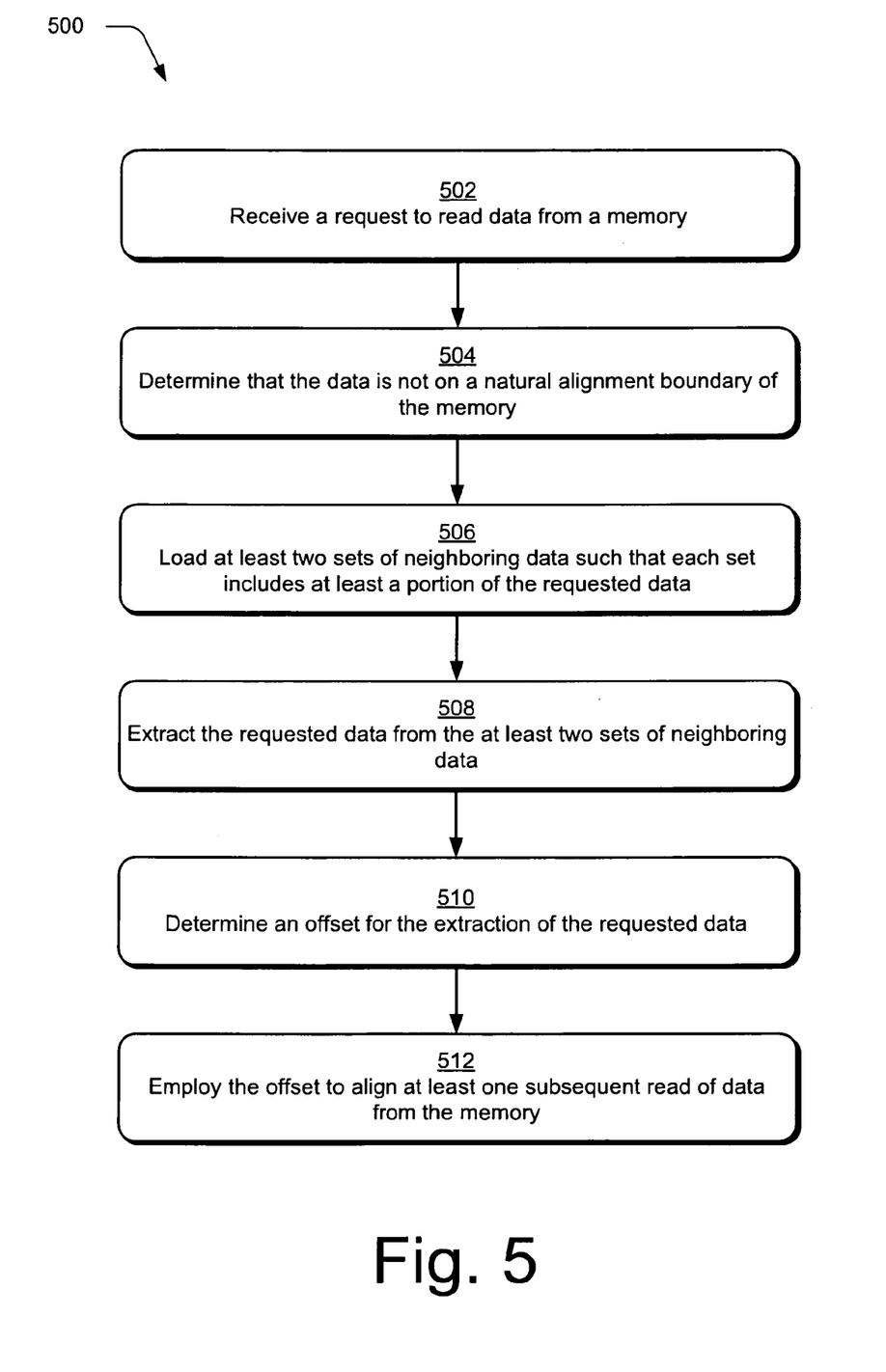
FIG. 5 is a flow diagram that depicts a procedure in an example implementation in which unaligned data is aligned and an offset is computed to be employed in a subsequent read of data.

FIG. 5 depicts a procedure 500 in an example implementation in which alignment techniques are described. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

A request is received to read data from a memory (block 502). For example, a function executed on the processor 104 may request data from a particular stream that is available in the memory 108, request a particular block of pixels to perform a motion search, and so on.

A determination may be made that the data is not on a natural alignment boundary of the memory (block 504). The alignment module 106, for instance, may determine that the requested data does not "fall" on a four byte boundary used for memory access addresses.

At least two sets of neighboring data are loaded such that each set includes at least a portion of the requested data (block 506). Continuing with the previous example, a first set of the neighboring data may define a word in memory 108 that includes at least a portion of the requested data. Likewise, a second set of the neighboring data may also define a word in the memory 108 that includes a portion of the requested data.

The requested data is extracted from the at least two sets of neighboring data (block 508). Continuing again with the previous example, these two portions may be used to form the requested data. For instance, the portions of the requested data may be extracted from the words to form a single word having the requested data. This single word may then be output to the processor 104, e.g., for use by the function which requested the data and/or another function through register linking. A variety of other instances are also contemplated.

Knowledge obtained to perform the first alignment may also be leveraged for subsequent alignment of unaligned data. For example, an offset may be determined for the extraction of the requested data (block 510). This offset may then be employed to align at least one subsequent read of data from the memory (block 512). As shown in FIG. 4, for instance, the offset shown in the first access 402 repeats for the second access 404 and the third access 406. Therefore, in an instance in which a regular pattern of unaligned reads from the memory 108 is desired, the offset may be reused automatically and without recalculation. In another instance, the offset may be used to calculate a new offset, e.g., the offset is not matching (e.g., as shown in FIG. 4) but may still be deterministic in that it may be calculated from the offset of the previous memory access.

Device Examples

FIGS. 6-13 illustrate some examples of various devices that can each be implemented as any form of a device to implement various embodiments of the previously described techniques. For example, any of the various devices can be implemented as a device that employs the above described techniques to align data that is not aligned on a natural alignment boundary. The techniques may be employed within signal processing and/or control functionality of the devices, examples of which are as follows.

Figure 6:
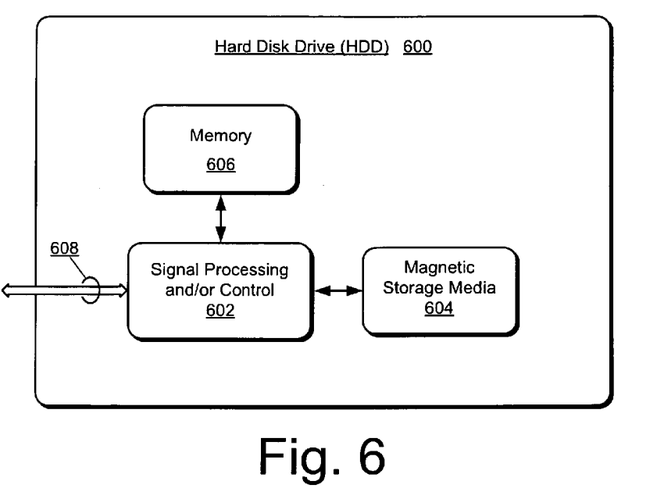
FIGS. 6-13 are examples of devices that may employ the aligned data access techniques.

FIG. 6 illustrates an example device that may be embodied as a hard disk drive (HDD) 600, which includes signal processing and/or control circuit(s) generally identified at 602. The HDD 600 can also include a magnetic storage media 604 and/or a memory 606, such as random access memory (RAM), a low-latency nonvolatile memory such as flash memory, read only memory (ROM), and/or other suitable electronic data storage. In various implementations, the signal processing and/or control circuit(s) 602 can be implemented to process data (e.g., any of encoding, decoding, encryption, and/or decryption), perform data calculations, and/or format data. The data can be output to and/or received from at least the magnetic storage media 604 and/or the memory 606. In addition, the HDD 600 can communicate with a host device (not shown) such as a computer or mobile computing devices, such as a personal digital assistant, cellular phone, media or MP3 player, and/or other devices via one or more wired or wireless communication links 608.

Figure 7:
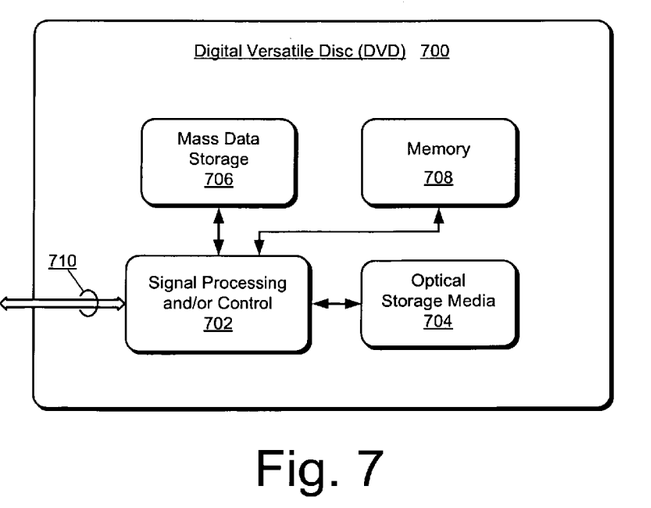

FIG. 7 illustrates an example device that may be embodied as a digital versatile disc (DVD) drive 700, which includes signal processing and/or control circuit(s) generally identified at 702. The DVD 700 can also include an optical storage media 704, mass data storage 706, and/or a memory 708, such as random access memory (RAM), a low-latency nonvolatile memory such as flash memory, read only memory (ROM), and/or other suitable electronic data storage. The mass data storage 706 can store data in a nonvolatile manner, and may include a hard disk drive (HDD) such as described with reference to FIG. 6, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with a DVD drive. The data can be written to and/or read from at least the optical storage media 704 and/or the memory 708. In addition, the DVD 700 can communicate with an output device (not shown) such as a computer, television, and/or other devices via one or more wired or wireless communication links 710.

Figure 8:
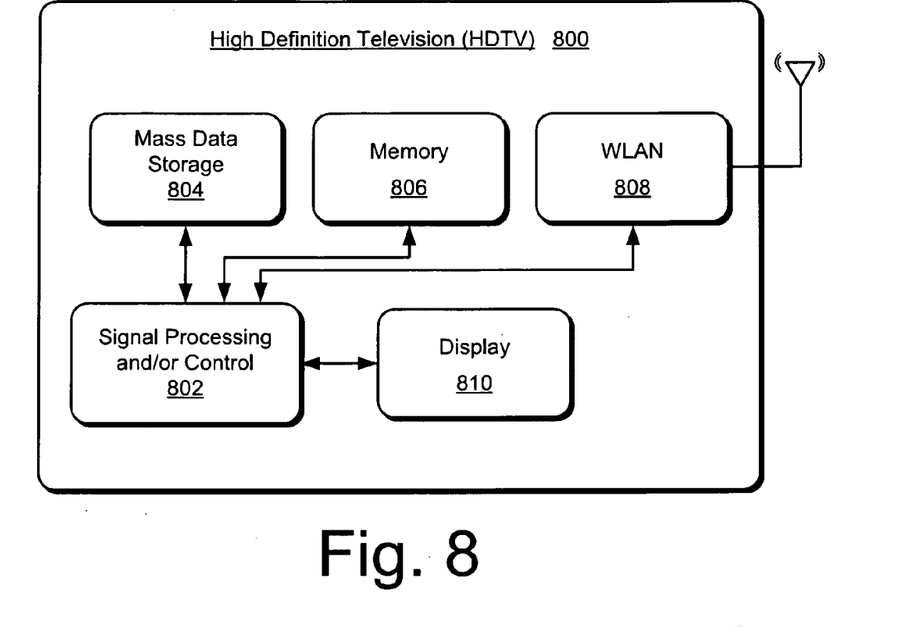

FIG. 8 illustrates an example device that may be embodied as a high definition television (HDTV) 800, which includes signal processing and/or control circuit(s) generally identified at 802. The HDTV 800 can also include mass data storage 804 and/or a memory 806, such as random access memory (RAM), a low-latency nonvolatile memory such as flash memory, read only memory (ROM), and/or other suitable electronic data storage. The mass data storage 804 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory 806. In addition, the HDTV 800 includes a wireless local area network (WLAN) interface 808 via which input signals can be received in either a wired or wireless format. HDTV output signals can be generated for a display 810.

Figure 9:
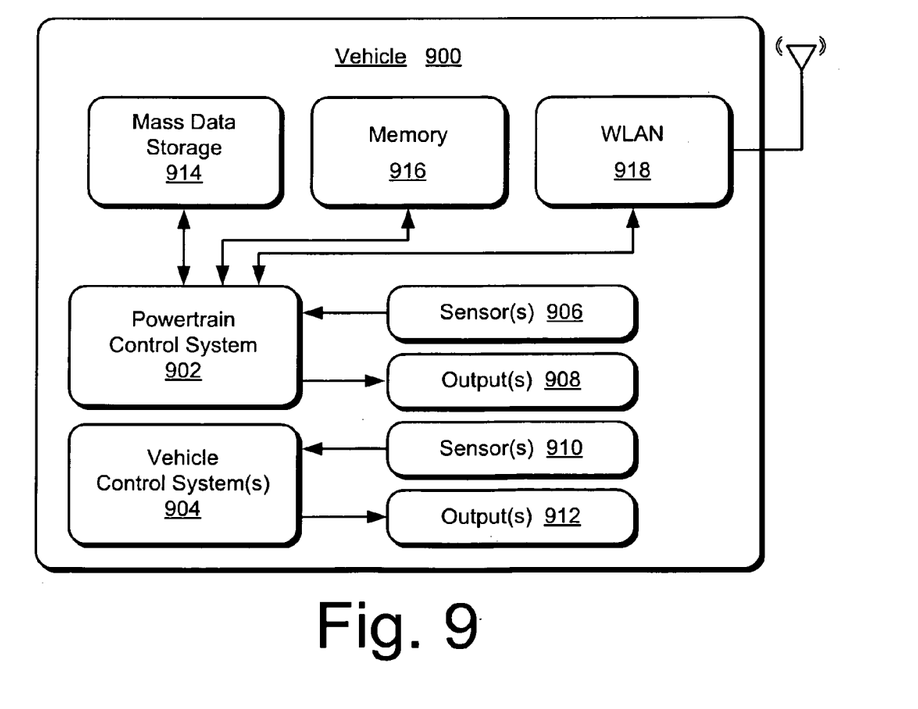

FIG. 9 illustrates an example device that may be embodied as a vehicle 900, which includes a powertrain control system 902 and, optionally, additional vehicle control system(s) 904. The powertrain control system 902 can receive data inputs from one or more sensors 906 such as temperature sensors, pressure sensors, rotational sensors, airflow sensors, and/or any other suitable sensors. The powertrain control system 902 can receive the data inputs and generate one or more output control signals 908, such as engine operating parameters, transmission operating parameters, and/or other control signals.

Additional control system(s) 904 may likewise receive data signals from one or more input sensors 910 and/or generate output control signals 912 to one or more output devices. In various implementations, a control system 904 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 900 can also include mass data storage 914 and/or a memory 916, such as random access memory (RAM), a low-latency nonvolatile memory such as flash memory, read only memory (ROM), and/or other suitable electronic data storage. The mass data storage 914 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches. In addition, vehicle 900 includes a wireless local area network (WLAN) interface 918 via which input signals can be received in either a wired or wireless format. The powertrain control system 902 also may support connections with a WLAN via the WLAN interface 918.

Figure 10:
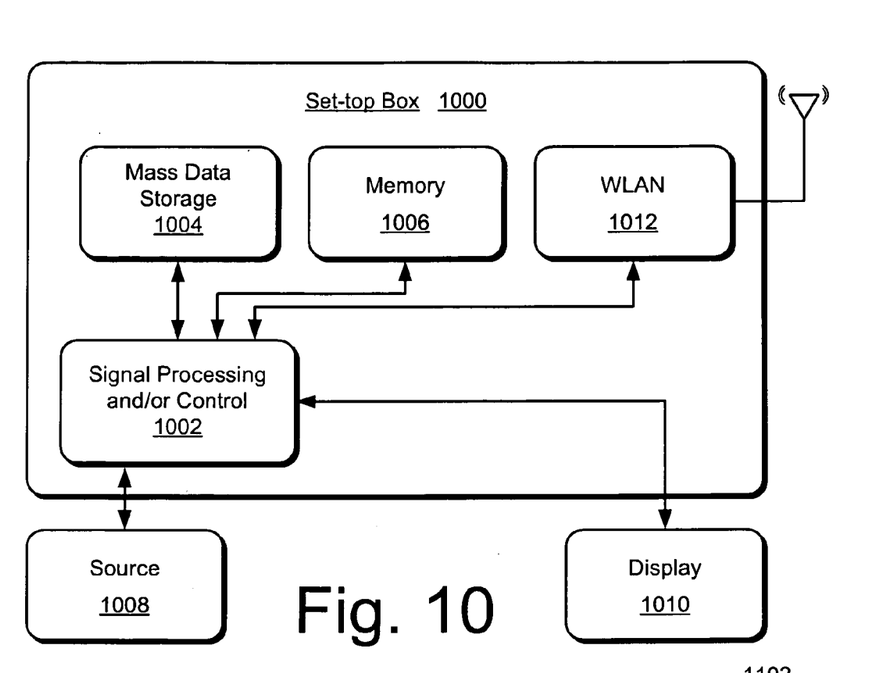

FIG. 10 illustrates an example device that may be embodied as a television set-top box 1000, which includes signal processing and/or control circuit(s) generally identified at 1002. The set-top box 1000 can also include mass data storage 1004 and/or a memory 1006, such as random access memory (RAM), a low-latency nonvolatile memory such as flash memory, read only memory (ROM), and/or other suitable electronic data storage. The mass data storage 1004 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

The set top box 1000 can receive data signals from a source 1008, such as a broadband source, and can then output standard and/or high definition audio/video signals suitable for a display 1010, such as a television, monitor, and/or other video and/or audio output devices. In various implementations, the signal processing and/or control circuit(s) 1002 can be implemented to process data (e.g., any of encoding, decoding, encryption, and/or decryption), perform data calculations, format data, and/or any other signal processing functions associated with a television set-top box. The data can be output to and/or received from at least the memory 1006 and/or the source 1008. In addition, the set-top box 1000 includes a wireless local area network (WLAN) interface 1012 via which input signals can be received in either a wired or wireless format. The set-top box 1000 may also support connections with a WLAN via the WLAN interface 1012.

Figure 11:
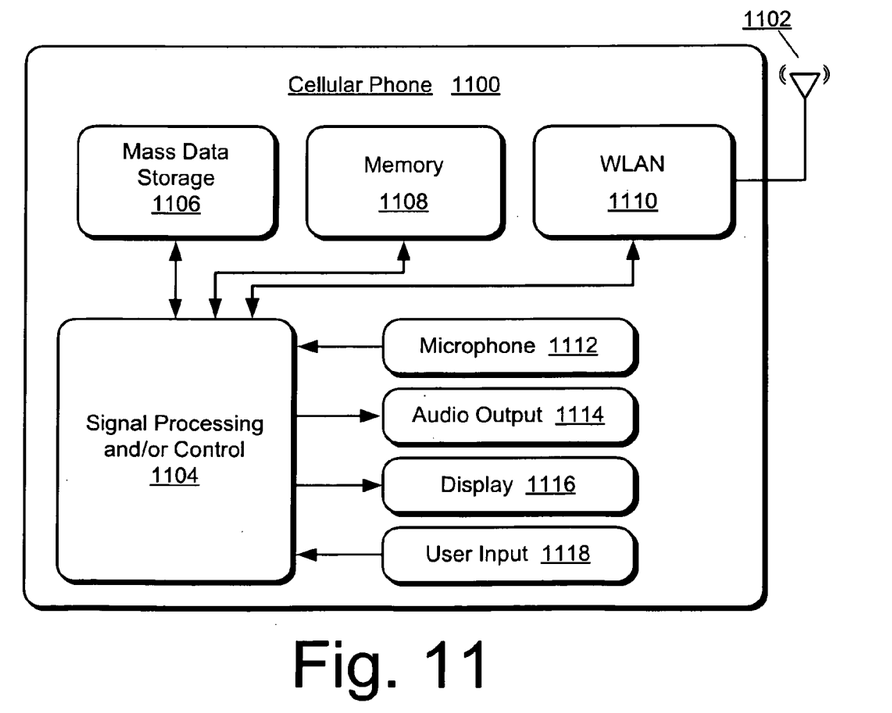

FIG. 11 illustrates an example device that may be embodied as a cellular phone 1100, which includes a cellular antenna 1102 and signal processing and/or control circuit(s) generally identified at 1104. The cellular phone 1100 can also include mass data storage 1106 and/or a memory 1108, such as random access memory (RAM), a low-latency nonvolatile memory such as flash memory, read only memory (ROM), and/or other suitable electronic data storage. The mass data storage 1106 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

Figure 12:
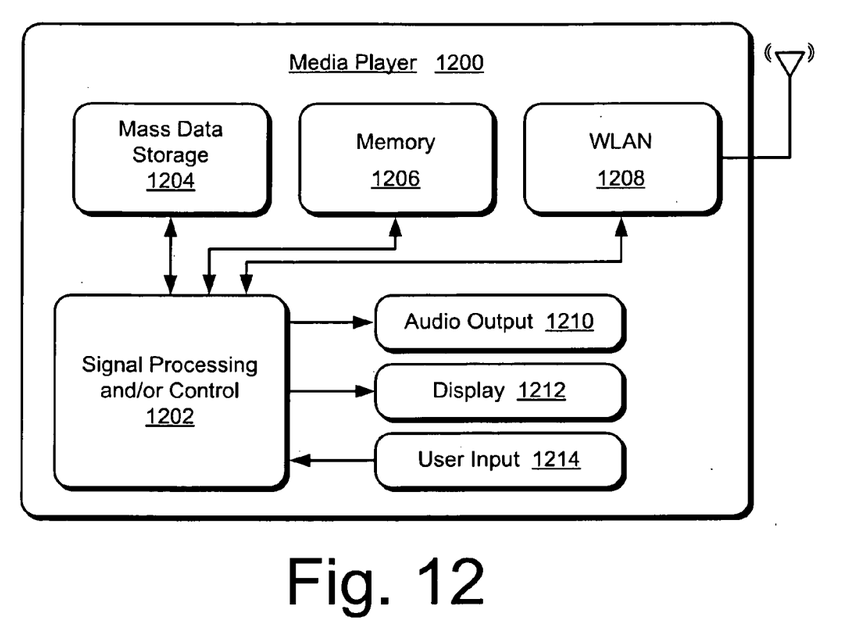

In various implementations, the signal processing and/or control circuit(s) 1104 can be implemented to process data (e.g., any of encoding, decoding, encryption, and/or decryption), perform data calculations, format data, and/or any other signal processing functions associated with a cellular phone. The data can be output to and/or received from at least the memory 1108. In addition, the cellular phone 1100 includes a wireless local area network (WLAN) interface 1110 via which input signals can be received in a wireless format. The cellular phone 1100 may also support connections with a WLAN via the WLAN interface 1110. In some implementations, the cellular phone 1100 can include a microphone 1112, an audio output 1114 such as a speaker and/or audio output jack, a display 1116, and/or an input device 1118 such as a keypad, pointing device, voice actuation, and/or other input device. D FIG. 12 illustrates an example device that may be embodied as a media player 1200, which includes signal processing and/or control circuit(s) generally identified at 1202. The media player 1200 can also include mass data storage 1204 and/or a memory 1206, such as random access memory (RAM), a low-latency nonvolatile memory such as flash memory, read only memory (ROM), and/or other suitable electronic data storage. The mass data storage 1204 can store data, such as compressed audio and/or video content, in a nonvolatile manner. In some implementations, compressed audio files include files that are compliant with an MP3 format or other suitable compressed audio and/or video formats. The mass data storage 1204 may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 1202 can be implemented to process data (e.g., any of encoding, decoding, encryption, and/or decryption), perform data calculations, format data, and/or any other signal processing functions associated with a media player. The data can be output to and/or received from at least the memory 1206. In addition, the media player 1200 includes a wireless local area network (WLAN) interface 1208 via which input signals can be received in either a wired or wireless format. The media player 1200 may also support connections with a WLAN via the WLAN interface 1208. In some implementations, the media player 1200 can include an audio output 1210 such as a speaker and/or audio output jack, a display 1212, and/or an input device 1214 such as a keypad, touchpad, pointing device, voice actuation, and/or other input device. In various implementations, media player 1200 may employ a graphical user interface (GUI) that typically includes menus, drop down menus, icons, and/or a point-and-click interface via display 1212 and/or user input 1214.

Figure 13:
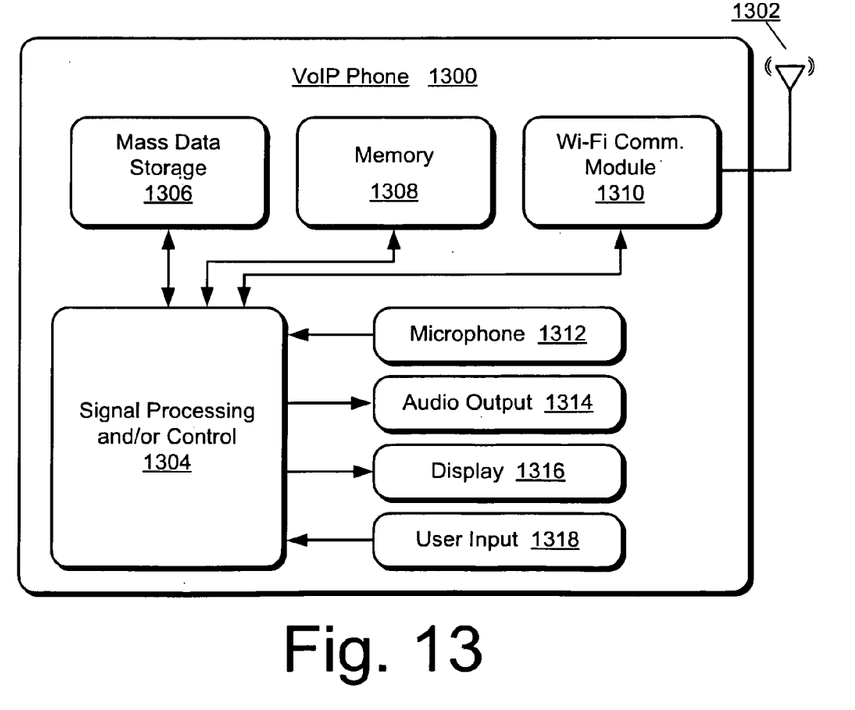

FIG. 13 illustrates an example device that may be embodied as a Voice over Internet Protocol (VoIP) phone 1300, which includes an antenna 1302 and/or is implemented in connection with a VoIP box that enables a conventional telephone to be plugged in and utilized with VoIP technology. The VoIP phone 1300 also includes signal processing and/or control circuit(s) generally identified at 1304. The VoIP phone 1300 can also include mass data storage 1306 and/or a memory 1308, such as random access memory (RAM), a low-latency nonvolatile memory such as flash memory, read only memory (ROM), and/or other suitable electronic data storage. The mass data storage 1306 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 1304 can be implemented to process data (e.g., any of encoding, decoding, encryption, and/or decryption), perform data calculations, format data, and/or any other signal processing functions associated with a VoIP phone. The data can be output to and/or received from at least the memory 1308. In addition, the VoIP phone 1300 includes a Wireless Fidelity (Wi-Fi) communication module 1310 via which communication links with a VoIP network can be established. In some implementations, the VoIP phone 1300 can include a microphone 1312, an audio output 1314 such as a speaker and/or audio output jack, a display 1316, and/or an input device 1318 such as a keypad, pointing device, voice actuation, and/or other input device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an alignment module, the alignment module implemented in a hardware that is external to a processor, and the alignment module configured to:
   identify requested data that is not aligned on a natural alignment boundary of memory;
   load at least two sets of neighboring data into stream registers such that each of the at least two sets of neighboring data includes at least a portion of the requested data;
   determine which one of the at least two sets of neighboring data in the stream registers contain a most significant bit of the requested data and which one other of the at least two sets of neighboring data contain a least significant bit of the requested data;
   swap an order of the at least two sets of neighboring data in the stream registers to place the at least two sets of neighboring data in a significance order for extraction;
   extract the requested data from the at least two sets of neighboring data based on which one of the at least two sets of neighboring data contain the most significant bit of the requested data and which one other of the at least two sets of neighboring data contain the least significant bit of the requested data; and
   output the extracted data to the processor.

2. The apparatus as described in claim 1, wherein the alignment module is further configured to:
   determine an offset based on the requested data, wherein the offset is used to extract the requested data from the at least two sets of neighboring data; and
   employ the offset to align at least one subsequent extraction of data that is not aligned on a natural alignment boundary of the memory.

3. The apparatus as described in claim 2, wherein the data in the subsequent extraction is different from the requested data that was used to determine the offset.

4. The apparatus as described in claim 2, wherein the data in the subsequent extraction and the requested data follow a regular memory access pattern.

5. The apparatus as described in claim 1, wherein the extracted data is output to the processor such that the processor is not made aware that the requested data is not aligned on the natural alignment boundary of the memory.

6. The apparatus as described in claim 1, wherein the natural alignment boundary defines an address from which access to the memory is permitted.

7. An apparatus comprising:
an alignment module configured to:
align requested data that is not aligned on a natural alignment boundary in memory by extracting the requested data from at least two sets of neighboring data in the memory, each of the at least two sets of the neighboring data including at least a portion of the requested data, wherein the extracting is based on a determination of which one of the at least two sets of neighboring data contain a most significant bit of the requested data and which one other of the at least two sets of neighboring data contain a least significant bit of the requested data;
responsive to the determination of which one of the at least two sets of neighboring data contain the most significant bit of the requested data and which one other of the at least two sets of neighboring data contain the least significant bit of the requested data, swap positions of the at least two sets of neighboring data to place the at least two sets of neighboring data in a significance order;
determine an offset based on the requested data, wherein the offset is used to extract the requested data from the at least two sets of the neighboring data;
provide the aligned requested data to a processor that is located external to a hardware of the alignment module; and
employ the offset to perform a subsequent alignment to align subsequent requested data read from the memory.

8. The apparatus as described in claim 7, wherein the subsequent requested data of the subsequent alignment is different than the requested data that was used to determine the offset.

9. The apparatus as described in claim 7, wherein the processor is not aware that the requested data was not aligned on the natural alignment boundary.

10. A method comprising:
identifying requested data that is not aligned on a natural alignment boundary of a memory;
loading at least two sets of neighboring data into stream registers such that each said set includes at least a portion of the requested data;
determining which one of the at least two sets of neighboring data in the stream registers contain a most significant bit of the requested data and which one other of the at least two sets of neighboring data contain a least significant bit of the requested data;
swapping an order of the at least two sets of neighboring data in the stream registers to place the at least two sets of neighboring data in a significance order for extraction;
extracting the requested data from the at least two sets of neighboring data based on which one of the at least two sets of neighboring data contain the most significant bit of the requested data and which one other of the at least two sets of neighboring data contain the least significant bit of the requested data; and
outputting the extracted data to a processor, wherein the identifying, the loading, the determining, the extracting, and the outputting are performed by one or more hardware components that are separate from the processor.

11. The method as described in claim 10, further comprising:
determining an offset based on the requested data, wherein the offset is used to extract the requested data from the at least two sets of neighboring data; and
employing the offset to align at least one subsequent extraction of data that is not aligned on a natural alignment boundary of the memory.

12. The method as described in claim 11, wherein the data in the subsequent extraction is different from the requested data that was used to determine the offset.

13. The method as described in claim 11, wherein the data in the subsequent extraction and the requested data follow a regular memory access pattern.

14. The method as described in claim 10, wherein the extracted data is output to the processor such that the processor is not made aware that the requested data is not aligned on the natural alignment boundary of the memory.

15. The method as described in claim 10, wherein the one or more hardware components comprise an alignment module.

16. The method as described in claim 10, wherein the natural alignment boundary defines an address from which access to the memory is permitted.

17. A method comprising:
aligning requested data that is not aligned on a natural alignment boundary in memory by extracting the requested data from at least two sets of neighboring data in the memory such that each said set of the neighboring data includes at least a portion of the requested data, wherein the extracting is based on a determination of which one of the at least two sets of neighboring data contain a most significant bit of the requested data and which one other of the at least two sets of neighboring data contain a least significant bit of the requested data;
responsive to the determining of which one of the at least two sets of neighboring data contain the most significant bit of the requested data and which one other of the at least two sets of neighboring data contain the least significant bit of the requested data, swapping positions of the at least two sets of neighboring data to place the at least two sets of neighboring data in a significance order;
determining an offset used to extract the requested data from the at least two said sets; and
employing the offset to align at least one subsequent read of requested data from the memory, wherein the aligning, the determining, and the employing are performed by an alignment module that is implemented in hardware that is separate from a processor that receives the aligned requested data.

18. The method as described in claim 17, wherein the processor that receives the aligned requested data is not aware that the aligned requested data was not aligned on the natural alignment boundary.

19. The method as described in claim 17, wherein the offset is employed to align the at least one subsequent read of requested data from the memory by alternating bits that are considered most significant and bits that are considered least significant for each said subsequent read.

* * * * *